United States Patent
Honda et al.

(10) Patent No.: US 7,738,642 B2
(45) Date of Patent: *Jun. 15, 2010

(54) REVERSE CHARGING SYSTEM, REVERSE-CHARGING SERVICE CONTROL APPARATUS, CALL AGENT AND REVERSE CHARGING METHOD

(75) Inventors: Yusuke Honda, Yokohama (JP); Satoshi Matsuhashi, Yokohama (JP); Kouichi Shimizu, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1211 days.

This patent is subject to a terminal disclaimer.

(21) Appl. No.: 11/311,153

(22) Filed: Dec. 20, 2005

(65) Prior Publication Data

US 2006/0098794 A1      May 11, 2006

Related U.S. Application Data

(63) Continuation of application No. 10/914,312, filed on Aug. 10, 2004, now Pat. No. 6,977,999.

(30) Foreign Application Priority Data

Jan. 26, 2004   (JP)   ............................. 2004-016850

(51) Int. Cl.
   H04M 15/00   (2006.01)
   H04L 12/66   (2006.01)
(52) U.S. Cl. ............... 379/114.21; 370/352; 379/114.23
(58) Field of Classification Search ............ 379/114.01, 379/114.03, 114.21–114.23, 121.05, 127.05; 370/352, 259, 493
   See application file for complete search history.

(56) References Cited

U.S. PATENT DOCUMENTS

| 6,636,504 | B1 | 10/2003 | Albers et al. |
| 6,819,667 | B1 | 11/2004 | Brusilovsky et al. |
| 6,977,999 | B2 * | 12/2005 | Honda et al. ........... 379/114.21 |
| 2003/0162526 | A1 | 8/2003 | Ogman et al. |
| 2005/0031101 | A1 | 2/2005 | Renton et al. |
| 2005/0152528 | A1 | 7/2005 | Newman et al. |

FOREIGN PATENT DOCUMENTS

JP      2001-309088     11/2001

OTHER PUBLICATIONS

Nikkei Communications, Issue of Aug. 7, 2000, pp. 104-105.
Nikkei Communications, Issue of Mar. 3, 2000, p. 89.

* cited by examiner

Primary Examiner—Quoc D Tran
(74) Attorney, Agent, or Firm—Antonelli, Terry, Stout & Kraus, LLP.

(57) ABSTRACT

A call agent (CA) connects a IP telephone and a public switching telephone on the basis of a called-destination telephone number which corresponds to received reverse-charging service number from the IP telephone; a reverse-charging service control apparatus causes an exchange to stop charging; the CA and the reverse-charging service control apparatus calculate a charging information items, respectively; and generate a fee information by setting a charged party information so that a sum of fees in an IP network and a public switching telephone network may be charged to the called-destination telephone number, and transmit the fee information to an IP/PSTN charging management apparatus on a called destination side; and generate other fee information so that a fee in the network on a call origination side may be charged to a business company of called destination, and transmit the fee information to the apparatus on a call origination side.

2 Claims, 17 Drawing Sheets

| REVERSE-CHARGING SERVICE NUMBER | CALLED DESTINATION TELEPHONE NUMBER | BUSINESS COMPANY IDENTIFICATION INFORMATION |
|---|---|---|
| 0120 - 111111 | 03 - 2222 - 2222 | PSTN BUSINESS COMPANY A |
| 0120 - 333333 | 045 - 555 - 5555 | PSTN BUSINESS COMPANY A |
| ⋮ | ⋮ | ⋮ |
| 0120 - 888888 | 050 - 999 - 9999 | IP BUSINESS COMPANY A |
| ⋮ | ⋮ | ⋮ |

FIG.6

| 211 | ROUTING NUMBER (701) | CONNECTION SYSTEM (702) |
|---|---|---|
| 703-1 | 045 | ORDINARY CALLING CONNECTION |
|  | ⋮ | ⋮ |
| 703-2 | 050 | ORDINARY CALLING CONNECTION |
| 703-N | 0120 | REVERSE CHARGING CONNECTION |

FIG.7

| 206 | CALLED DESTINATION TELEPHONE NUMBER (801) | IP ADDRESS (802) |
|---|---|---|
| 803-1 | 03 - 2222 - 2222 | 100. 10. 10. 10 |
| 803-2 | 045-555-5555 | 100. 10. 10. 50 |
| ⋮ | ⋮ | ⋮ |
| 803-N | 050-999-9999 | 100. 10. 10. 100 |

FIG.8

| 303 | TELEPHONE NUMBER 901 | TERMINAL TYPE 902 |
|---|---|---|
| 903-1 | — | PSTN SUBSCRIBER TELEPHONE |
| 903-2 | 0 3 | PSTN SUBSCRIBER TELEPHONE |
| 903-3 | 0 4 5 | PSTN SUBSCRIBER TELEPHONE |
| 903-N | 0 5 0 | IP TELEPHONE |

FIG.9

| 312 | REVERSE-CHARGING SERVICE CONTRACTOR TERMINAL | CALL ORIGINATING TERMINAL | PSTN FEE RATE | IP FEE RATE |
|---|---|---|---|---|
| 1005-1 | IP TELEPHONE | IP TELEPHONE | (a / 3min) | e / 3min |
| 1005-2 | IP TELEPHONE | PSTN SUBSCRIBER TELEPHONE | b / 3min | f / 3min |
| 1005-3 | PSTN SUBSCRIBER TELEPHONE | IP TELEPHONE | c / 3min | g / 3min |
| ⋮ | ⋮ | ⋮ | ⋮ | ⋮ |
| 1005-N | PSTN SUBSCRIBER TELEPHONE | PSTN SUBSCRIBER TELEPHONE | d / 3min | (h / 3min) |

FIG.10

REVERSE CHARGING SYSTEM, REVERSE-CHARGING SERVICE CONTROL APPARATUS, CALL AGENT AND REVERSE CHARGING METHOD

CROSS REFERENCE TO RELATED APPLICATION

This is a continuation of U.S. application Ser. No. 10/914,312, filed Aug. 10, 2004, now U.S. Pat. No. 6,977,999, the entirety of all of the contents and subject matter of which are incorporated herein by reference.

BACKGROUND OF THE INVENTION

1. Field of the Invention

The present invention relates to a reverse charging system, a reverse-charging service control apparatus, a call agent and a reverse charging method. More particularly, it relates to a reverse charging system, a reverse-charging service control apparatus, a call agent and a reverse charging method for providing a reverse charging service in a telephone network which is capable of interconnecting IP telephone sets and public switching telephone sets.

2. Description of the Related Art

In the existing PSTN (Public Switching Telephone Network), exchanges operate in concert with IN (Intelligent Network) apparatuses through a common channel signaling system, whereby telephone services of high functions are provided.

One of the telephone services is a reverse charging service which is currently rendered in the PSTN, and which uses special numbers beginning with a number "0120". The reverse charging service in the PSTN is stated in, for example, JP-A-2001-309088. In an invention stated in this document, telephone numbers for reverse charging and the called destination telephone numbers of service contractors are registered in a database for providing the reverse charging service. In a case where a call to any service contractor has originated, an exchange which accommodates a call originating terminal identifies the called destination telephone number to be a subject for the reverse charging service, and it notifies the reverse-charging telephone number to a network service control station which is a kind of IN apparatus. The network service control station searches the database for the called destination telephone number corresponding to the reverse-charging telephone number, it notifies the sought destination telephone number to the originating exchange, and it performs a calling connection process for the destination telephone number. At the same time, the network service control station instructs the originating exchange not to charge a call fee to the call originator. When telephonic communication has ended, the network service control station generates fee information in which the called destination telephone number is set as the charged party of a call fee, and it transmits the information to a billing center.

The reverse charging service is provided in the PSTN by the method as stated above. In recent telephone networks, the PSTN and IP (Internet Protocol) networks are being merged. It is desired to render the various telephone services having been provided in the PSTN, also for IP telephone sets.

Besides, in general, in the connection between the PSTN and the IP network, the interconnection is realized by installing a media gateway (MG) which cross-converts the STM (Synchronous Transfer Mode) voice signal data of the PSTN and IP voice packets, a signaling gateway (SG) which connects a common channel signaling network and the IP network so as to transmit and receive control signals, and a call agent (CA) which converts a common channel signal received by the SG, into a signal for an MG control conforming to an MGCP (Media Gateway Control Protocol), so as to perform the MG control. These techniques are stated in, for example, "Nikkei Communications", Issue of Aug. 7, 2000, p. 104-p. 105.

This connection system will be outlined. First, in a case where an IP telephone subscriber has originated a call from an IP telephone to a PSTN subscriber telephone, the CA receives the calling source telephone number of the IP telephone being a call originator, and a called destination telephone number. Subsequently, the CA searches a database for the IP address of the MG connected with an exchange which accommodates the PSTN subscriber telephone being a called destination, on the basis of the toll number of the received called-destination telephone number, and it is connected with the MG. Further, the CA is connected with the exchange on the basis of the called destination telephone number so as to permit telephonic communication with the PSTN subscriber telephone.

Besides, regarding charging based on the connection between the PSTN and the IP network, another document states a charging system wherein a CA calculates a rental fee involved in an IP network and a connection fee arising between the IP network and an exchange, and an IP business company demands the payment of the fees from an IP telephone owner, while the exchange which accommodates a PSTN subscriber telephone being a called destination calculates the rental fee of the exchange, and the PSTN demands the payment of the rental fee from the IP business company. This technique is stated in, for example, "Nikkei Communications", Issue of Mar. 3, 2000, p. 89.

SUMMARY OF THE INVENTION

In a case where, in conformity with the prior-art connection system and charging system as explained above, a reverse charging service is to be rendered in call reception at a PSTN subscriber telephone as based on call origination from an IP telephone, there are problems as stated below.

Usually, a CA acquires the information of a called destination telephone number in response to the call origination from the IP telephone, and it acquires the IP address of an MG connected with an exchange which accommodates the PSTN subscriber telephone being a called destination, on the basis of a toll number. As the problem #1, however, a routing number (for example, number "0120") which indicates reverse charging is not an office number, so that the CA in the prior art cannot specify the exchange (or MG) being a connection destination.

Further, the charging method in the related art has the problem #2 that, since the PSTN subscriber telephone set being a reverse-charging service contractor is not a telephone set existing in an IP network, the CA of an IP business company cannot specify a business company and the contractor being a demandee for the payment of a fee. By way of example, in the case where a telephone call is made from the IP telephone to the PSTN subscriber telephone by the reverse charging, a fee involved in the IP network is charged to the PSTN subscriber telephone. Since, however, the IP business company does not know the name, address, etc. of the PSTN subscriber, it cannot directly demand the payment of the fee.

Besides, the related-art charging system has the problem #3 that the exchange cannot alter the charged party for the connection fee between the business sites of this exchange and the MG, from the call originating business company to the call destination business company. In the case of, for example, the connection from the side of the IP network to the exchange, the prior-art charging system is contrived to charge the connection fee between the business sites, to the IP business company being the originating business company. The reverse charging cannot be realized using the exchange as it is.

On the other hand, in a case where a reverse charging service is to be rendered in call reception at an IP telephone as based on call origination from a PSTN subscriber telephone, there is the problem #4 that, since the IP telephone being a reverse-charging service contractor. is not a telephone set existing in the PSTN, the PSTN business company cannot specify a demandee for the payment of a fee.

Moreover, problems similar to the problems #1-#4 which are posed in realizing the reverse charging between the IP telephone and the PSTN subscriber telephone can occur also in case of realizing reverse charging between different IP telephone business companies.

In view of the above drawbacks, the invention has for its object to provide a reverse-charging service control apparatus and system for realizing a reverse charging service in a telephone network in which IP telephone sets and public switching telephone sets can be interconnected.

The above problem #1 is solved by installing a CA which has the discrimination function of recognizing the routing number for the reverse charging service as is contained in the called destination telephone number having received the call origination from the IP telephone, thereby to discriminate whether or not the pertinent call is of the reverse charging service, and a reverse-charging service control apparatus which has the functions of receiving from the CA the number for the reverse charging service, searching a table where numbers for the reverse charging service and called destination telephone numbers are held in correspondence, and sending the called destination telephone number to the CA in reply.

Regarding the problem #2, the demandee for the payment can be specified in such a way that the reverse-charging service control apparatus instructs the CA for charging the rental fees of the IP network and the exchange, to alter a charged party to the called destination telephone number of the reverse-charging service contractor, that the CA generates fee information, in which the called destination telephone number of the reverse-charging service contractor is set as the charged party, and then transmits the fee information to the PSTN charging management apparatus through the reverse-charging service control apparatus, and that the telephone number of the reverse-charging service contractor set as the charged party is searched for by the PSTN charging management apparatus.

The problem #3 can be solved in such a way that, in the reverse charging service, the reverse-charging service control apparatus performs the control of bringing the charging status of the exchange into the non-charging status thereof, and that the reverse-charging service control apparatus charges the rental fee of the exchange and sets as the charged party the called destination telephone number of the reverse-charging service contractor as stored in the apparatus itself.

Regarding the problem #4, the demandee for the payment can be specified in such a way that, in the reverse charging service, the reverse-charging service control apparatus performs the control of bringing the charging status of the exchange into the non-charging status thereof, that the reverse-charging service control apparatus charges the rental fee of the exchange and generates fee information in which the called destination telephone number of the reverse-charging service contractor is set as the charged party, so as to transmit the generated fee information to the IP charging management apparatus, and that the telephone number of the reverse-charging service contractor set as the charged party is searched for by the IP charging management apparatus.

BRIEF DESCRIPTION OF THE SEVERAL VIEWS OF DRAWING

FIG. 6 is a diagram showing an example of a database for a reverse charging service as is included in a called-destination-number storage unit;

FIG. 7 is a diagram showing an example of a database which is included in a routing-number discrimination unit;

FIG. 8 is a diagram showing an example of a database which is included in an IP-address storage unit;

FIG. 9 is a diagram showing an example of a database which is included in a terminal discrimination unit;

FIG. 10 is a diagram showing an example of a database in a fee-rate discrimination unit;

DETAILED DESCRIPTION OF THE INVENTION

Figure 1:
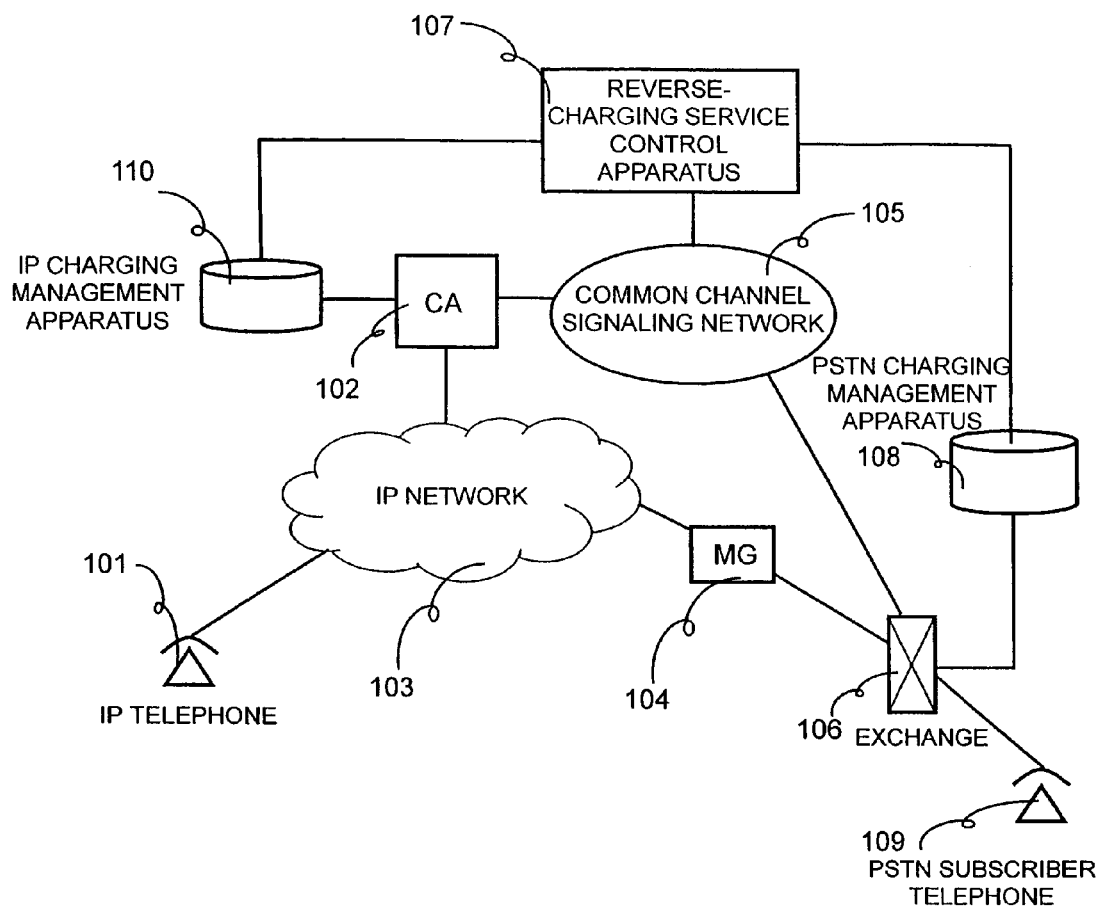
FIG. 1 is a diagram showing an architectural example of the interconnection network between an IP network and a PSTN as is furnished with a reverse-charging service control apparatus.

First, a network architecture and an apparatus configuration will be described. FIG. 1 is a diagram showing an example of the architecture (reverse charging system) of the interconnection network between an IP network and a PSTN as is furnished with a reverse-charging service control apparatus. The reverse charging system includes a CA (call agent) 102, an MG (media gateway) 104, an exchange 106, the reverse-charging service control apparatus 107, a PSTN charging management apparatus 108, and an IP charging management apparatus 110.

An IP telephone 101, the CA 102 and the MG 104 are connected to the IP network 103. The CA 102 is connected with a common channel signaling network 105 so as to communicate control signals with the PSTN and to perform a call control. Also, it is connected with the IP charging management apparatus 110 which holds and manages, for example, charging information on individual IP telephones. On the other hand, on the side of the PSTN, the exchange 106 which accommodates PSTN subscriber telephones 109 is connected with the MG 104, and it is connected with the PSTN charging management apparatus 108 which holds and manages, for example, exchange rental-fee information and charging information to the PSTN telephones.

The reverse-charging service control apparatus 107 is connected with the CA 102 and the exchange 106 through the common channel signaling network 105 so as to control a calling connection process in a reverse charging service. Further, the reverse-charging service control apparatus 107 is connected with the PSTN charging management apparatus 108 and the IP charging management apparatus 110 so as to manage charging information with both the management apparatuses combined. Incidentally, it is possible to install a plurality of CA 102, exchanges 106, etc. Besides, although FIG. 1 illustrates the case of one IP business company and one PSTN business company, it is also possible to lay out a system in which pluralities of IP business companies and PSTN business companies are existent. In this case, by way of example, the PSTN charging management apparatus 108 or the IP charging apparatus 110 may well be installed every business company.

Figure 2:
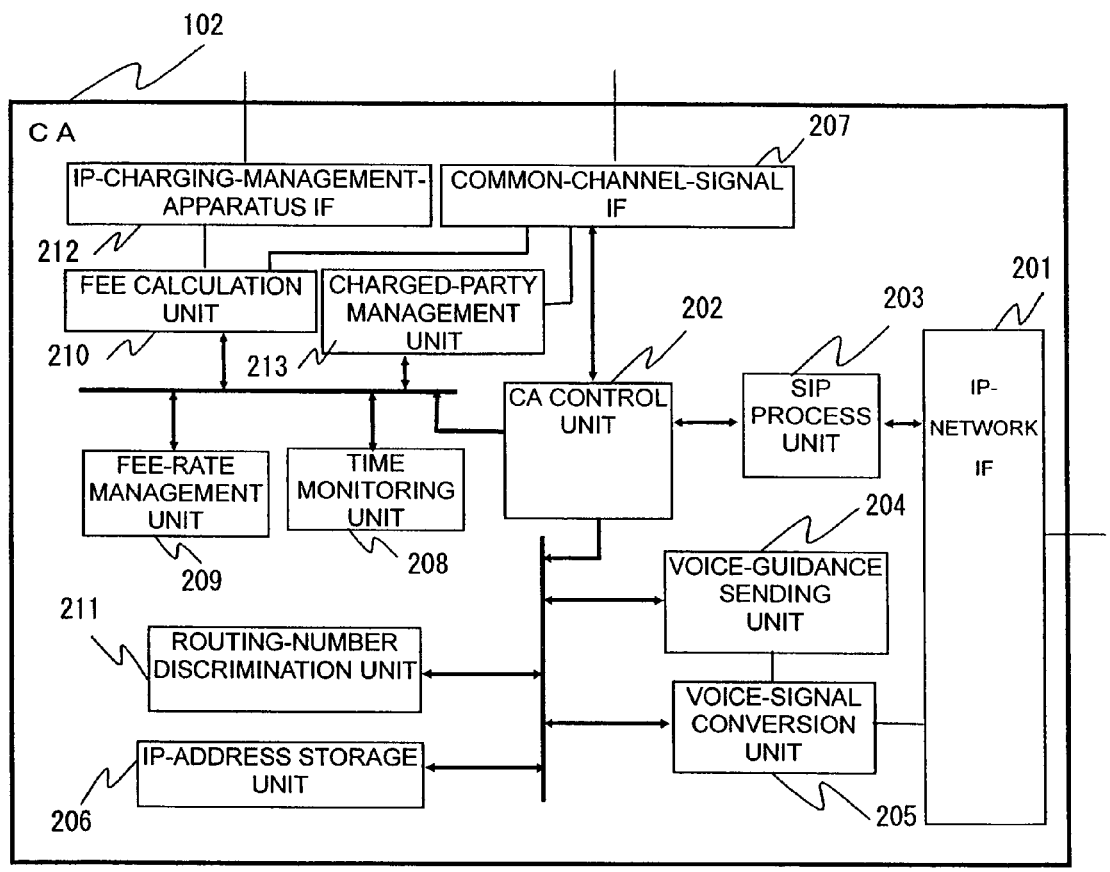
FIG. 2 is a diagram showing a block configurational example of a call agent.

FIG. 2 is a diagram showing an example of the block configuration of the CA 102 which has functions for realizing the reverse charging service. The CA 102 includes an IP-network interface 201, an SIP (Session Initiation Protocol) process unit 203, a voice-guidance sending unit 204, a voice-signal conversion unit 205, an IP-address storage unit 206, a common-channel-signal IP 207, a time monitoring unit 208, a fee-rate management unit 209, a fee calculation unit 210, a routing-number discrimination unit 211, an IP-charging-management-apparatus interface 212, a charged-party management unit 213, and a CA control unit 202. Incidentally, the fee-rate management unit 209 and the charged-party management unit 213 may well be appropriately provided within, for example, the fee calculation unit 210 or the CA control unit 202.

The IP-network interface 201 is connected with the IP network 103 so as to transmit and receive the IP packets of call controlling data, voice data, etc. The SIP process unit 203 executes, for example, an SIP (Session Initiation Protocol) as a call control protocol. Incidentally, an appropriate call control protocol such as "H. 323" may well be employed otherwise than the SIP. The voice-guidance sending unit 204 serves as a sound source for notifying the fact that a reverse-charging service number is not registered in the routing-number storage unit 211, to a call originator through voice guidance or the like. Incidentally, the data etc. of the voice guidance are registered in the voice-guidance sending unit 204 beforehand. The voice-signal conversion unit 205 converts, for example, the data of the voice guidance into voice packets in order to convey the voice guidance to the IP telephone 101 which is connected via the IP network.

The correspondence table between the called destination telephone numbers and IP addresses of individual subscribers is stored in the IP-address storage unit 206 beforehand. The common-channel-signal interface 207 is an interface which is connected with the common channel signaling network 105, and which serves to transmit and receive information items such as a calling source telephone number and the called destination telephone number of a reverse-charging service contractor. The time monitoring unit (first time monitoring unit) 208 monitors, for example, the talking time of the telephonic communication between the IP telephone and the PSTN telephone. The fee-rate management unit (first fee-rate management unit) 209 manages the fee rates of call fees as correspond to, for example, time periods, talking distances, etc. In this embodiment, the fee rates contain, for example, an IP fee rate which indicates the fee of every predetermined time in the IP network, and a PSTN fee rate which indicates the fee of every predetermined time in the PSTN. Besides, the connection fee between the business companies, namely, between the exchange and the MG as arises in the case of connection from the IP network to the PSTN through the exchange can be contained in, for example, the PSTN fee rate. The fee calculation unit (first fee calculation unit) 210 calculates a call fee after the end of telephonic communication, and it generates fee information which contains charged-party information and the fee (charging information). The routing-number discrimination unit 211 stores the routing numbers of reverse-charging service numbers therein, and it discriminates whether or not a call is of reverse charging. The IP-charging-management-apparatus interface 212 is an interface for connection and communication with the IP charging management apparatus 110. The charged-party management unit 213 manages the charged parties of call fees in the reverse charging service. The CA control unit 202 controls the various blocks within the CA 102.

Figure 3:
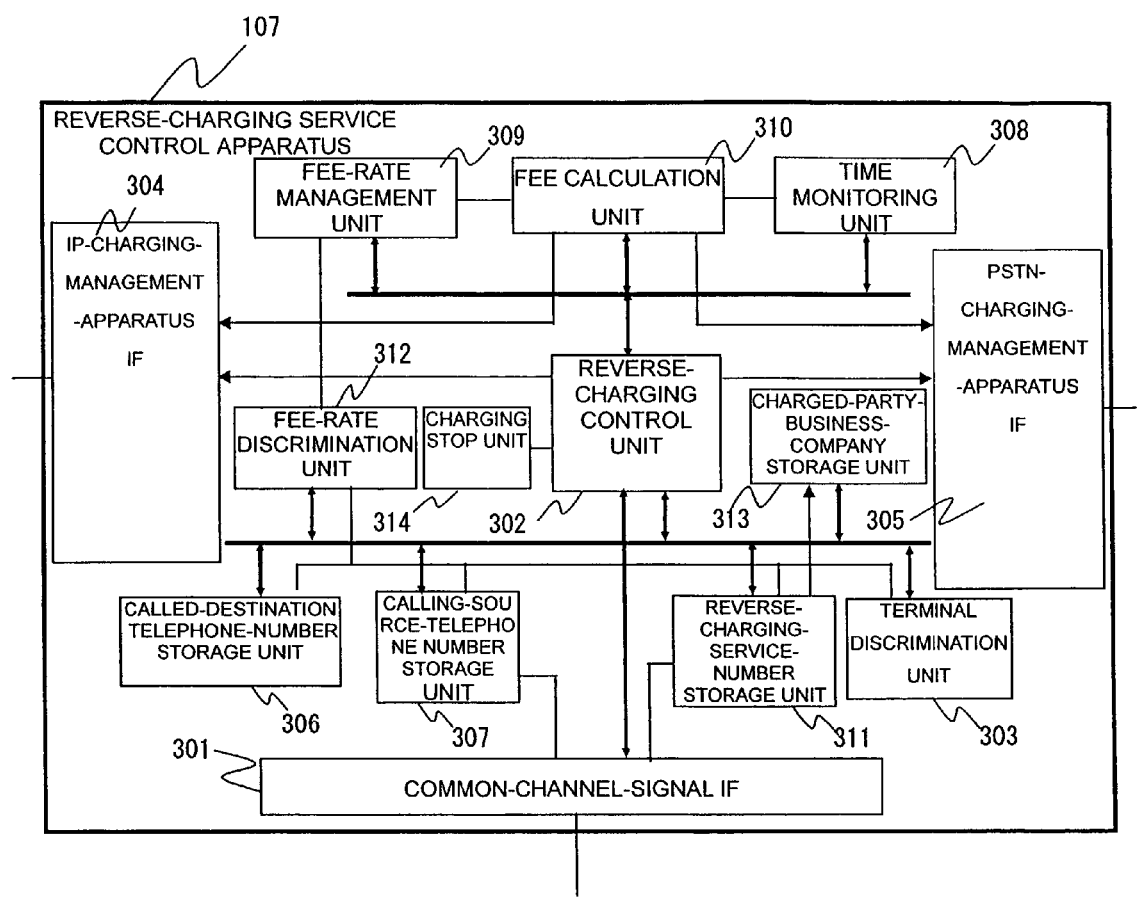
FIG. 3 is a diagram showing a block configurational example of the reverse-charging service control apparatus.

FIG. 3 is a diagram showing an example of the block configuration of the reverse-charging service control apparatus which has functions for realizing the reverse charging service. The reverse-charging service control apparatus 107 includes a common-channel-signal interface 301, a terminal discrimination unit 303, an IP-charging-management-apparatus interface 304, a PSTN-charging-management-apparatus interface 305, a called-destination-telephone-number storage unit 306, a calling-source-telephone-number storage unit 307, a time monitoring unit 308, a fee-rate management unit 309, a fee calculation unit 310, a reverse-charging-service-number storage unit 311, a fee-rate discrimination unit 312, a charged-party-business-company storage unit 313, a charging stop unit 314, and a reverse-charging control unit 302. Incidentally, the called-destination-telephone-number storage unit 306, calling-source-telephone-number storage unit 307, fee-rate management unit 309, reverse-charging-service-number storage unit 311 and charged-party-business-company storage unit 313, and the charging stop unit 314 may well be appropriately provided within, for example, the fee calculation unit 310 and the reverse-charging control unit 302, respectively.

The common-channel-signal interface 301 is an interface which is connected to the common channel signaling network 105, and which serves to transmit and receive information items such as a calling source telephone number and the called destination telephone number of a reverse-charging service contractor. The terminal discrimination unit 303 has a database in which terminal types (IP telephones or PSTN subscriber telephones) are stored in correspondence with, for example, telephone numbers, and it discriminates the terminal types on the basis of the telephone numbers. The IP-charging-management-apparatus interface 304 is an interface for connection with the IP charging management apparatus 110. The PSTN-charging-management-apparatus interface 305 is an interface for connection with the PSTN charging management apparatus 108. The called-destination-telephone-number storage unit 306 temporarily stores therein the called destination telephone number of a reverse-charging service contractor searched for from the reverse-charging-service-number storage unit 311. The calling-source-telephone-number storage unit 307 temporarily stores the telephone number of a call originating terminal.

The time monitoring unit (second time monitoring unit) 308 monitors a talking time. The fee-rate management unit (second fee-rate management unit) 309 manages the fee rates (for example, IP fee rate and PSTN fee rate) of call fees as correspond to, for example, time periods, talking distances, etc. The fee calculation unit (second fee calculation unit) 310 calculates a call fee after the end of telephonic communication. Incidentally, the time monitoring unit 308 and the fee-rate management unit 309 can be endowed with the same functions as those of the respectively corresponding units of the CA 102.

The correspondence table between the reverse-charging service numbers of the reverse-charging service contractors and the called destination telephone numbers thereof is stored in the reverse-charging-service-number storage unit 311 beforehand. The fee rate discrimination unit 312 has a database in which the IP fee rate and the PSTN fee rate are stored in correspondence with the combinations of call originating terminals and call reception terminals, and it discriminates the fee rate in accordance with the sorts of the call originating terminal and the call reception terminal in the reverse charging service. The charged-party-business-company storage unit 313 temporarily stores therein the information of a business company which is altered to a charged party. The charging stop unit 314 stops the charging of the exchanges on the call originating side and the called destination side. The reverse-charging control unit 302 controls the various functional blocks within the reverse-charging service control apparatus 107.

Figure 4:
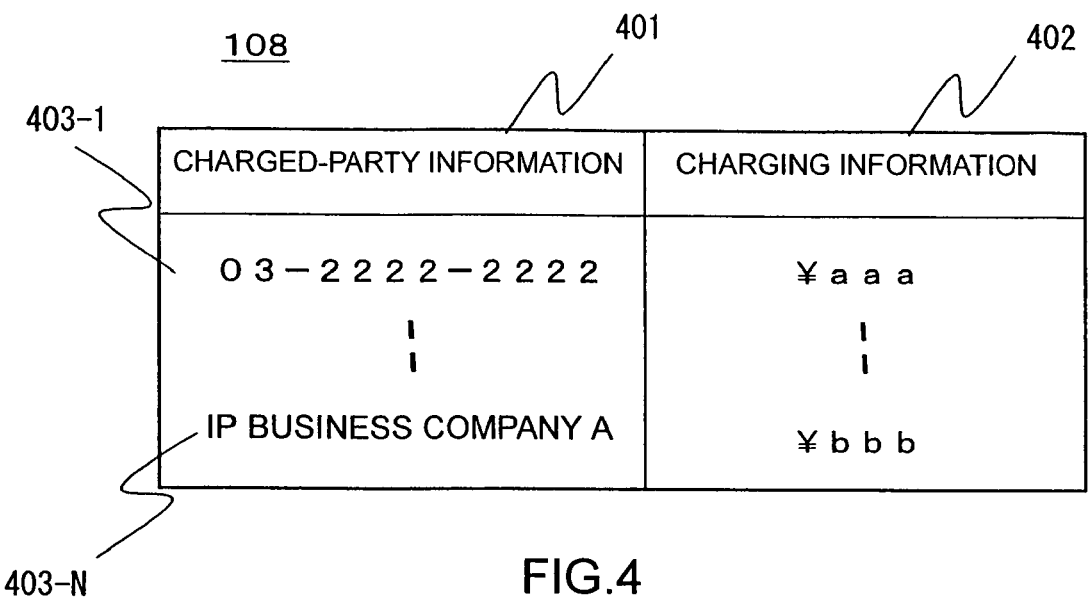
FIG. 4 is a diagram showing an example of a fee charging database which is included in a PSTN charging management apparatus.

Next, data formats will be described. FIG. 4 is a diagram showing an example of a fee charging database which is included in the PSTN charging management apparatus 108. The database contains charging information 402 which corresponds to the charged-party information 401 of each call fee. In the database shown in FIG. 4, the telephone number 401 of a PSTN subscriber being the charged party of a call fee, and the charging information 402 indicating a total call fee up to the present time are registered at, for example, an entry 403-1. Registered at an entry 403-N are, for example, the charged-party information 401 of an IP business company A being the charged party of the fee (for example, the identification information of the IP business company A), and the charging information 402 for charging a connection fee which arises when the PSTN side is connected to the IP network possessed by the IP business company A. In this embodiment, in order to realize the reverse charging, the connection fee in the case of the connection from the PSTN side to the IP side is charged to the IP business company on the called destination side.

Figure 5:
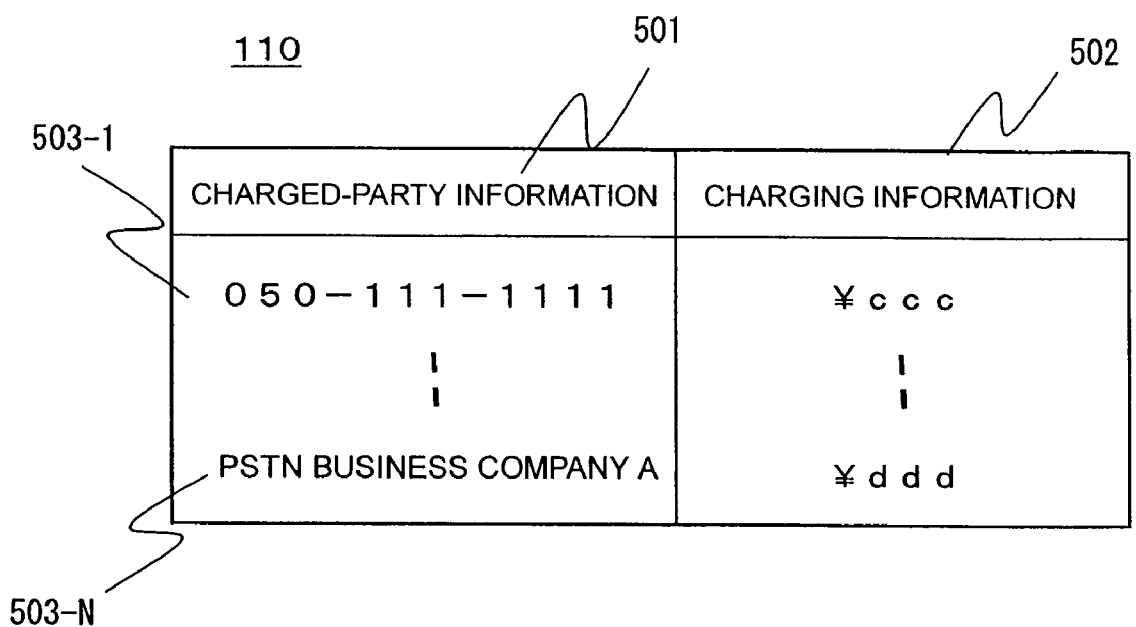
FIG. 5 is a diagram showing an example of a fee charging database which is included in an IP charging management apparatus.

FIG. 5 is a diagram showing an example of a fee charging database which is included in the IP charging management apparatus 110. The database contains charging information 502 which corresponds to the charged-party information 501 of each call fee. In the database shown in FIG. 5, the telephone number 501 of an IP telephone subscriber being the charged party of the call fee, and the charging information 502 being a total call fee up to the present time are registered at, for example, an entry 503-1. Registered at an entry 503-N are the charged-party information 501 of the PSTN side being the charged party of the fee (for example, the identification information of the PSTN business company), and the charging information 502 for charging a connection fee which arises when the IP business company side is connected to the PSTN. In this embodiment, in order to realize the reverse charging, the connection fee in the case of the connection from the IP side to the PSTN is charged to the PSTN business company on the called destination side, not to the call originating side to which the connection fee is usually charged. FIG. 6 is a diagram showing a configurational example of a database for the reverse charging service as is included in the reverse-charging-service-number storage unit 311 of the reverse-charging service control apparatus 107 for realizing the reverse charging service with the IP network. The database contains the called destination telephone numbers 602 of reverse-charging service contractors, and the identification information items 604 of telephone business companies with which the owners of called destination telephone terminals contract, in correspondence with the reverse-charging service numbers 601 of the reverse-charging service contractors.

The business company identification information 604 can also be registered in case of registering anew the reverse-charging service number 601 of a reverse-charging service contractor and the called destination telephone number 602 thereof. Alternatively, when the reverse-charging service number 601 of a reverse-charging service contractor and the called destination telephone number 602 thereof are registered, the reverse-charging service control apparatus 107 can automatically register the business company 604 on the basis of a business company number which is allocated to the several upper digits of the telephone number.

In the database included in the reverse-charging-service-number storage unit 311, the reverse-charging service numbers 601 of PSTN subscriber telephone owners being the contractors of the reverse charging service, the called destination telephone numbers 602 of the reverse-charging service contractors, and a PSTN business company A with which the reverse-charging service contractors contract are registered at, for example, entries 603-1 and 603-2. Besides, regarding an entry 603-N by way of example, there are registered the reverse-charging service number 601 of an IP telephone owner. being the contractor of the reverse charging service, the called destination telephone number 602 of the reverse-charging service contractor, and an IP business company A with which the reverse-charging service contractor contracts.

FIG. 7 is a diagram showing a configurational example of a database which is included in the routing-number discrimination unit 211 within the CA 102. The database contains a connection system 702 in which either ordinary calling connection or reverse charging connection is registered in correspondence with, for example, a routing number 701. In the database shown in FIG. 7, at an entry 703-1 by way of example, "045" being the office number of a telephone number is registered in the routing number 701, and the ordinary calling connection is registered in the connection system 702 because the registered number is not the routing number of the reverse charging service. Likewise, at an entry 703-2, "050" being the telephone number of an IP telephone is registered in the routing number 701, and the ordinary calling connection is registered in the connection system 702 because the telephone number registered in the routing number 701 is not the routing number of the reverse charging service.

On the other hand, at an entry 703-N, "0120" being the routing number of the reverse charging service is registered in the routing number 701, and the reverse charging connection is registered in the connection system 702 because the number "0120" indicates the reverse charging service. Incidentally, only the items concerning the reverse charging service may well be registered in the table, so as to judge the ordinary calling connection in the nonexistence of a corresponding entry. FIG. 8 is a diagram showing a configurational example of a database which is included in the IP-address storage unit 206 within the CA 102. The database contains the IP addresses 802 of called destinations in correspondence with called destination telephone numbers 801. In the database shown in FIG. 8, the called destination telephone numbers 801 registered at, for example, entries 803-1 and 803-2 are the telephone numbers of the subscribers of the PSTN, and the IP addresses 802 of the MGs 104 connected with the exchanges 106 accommodating PSTN subscriber telephones are registered at these entries beforehand. The called destination telephone number 801 registered at an entry 803-N is the telephone number of an IP telephone subscriber, and the IP address 802 of an IP telephone being the called destination is registered at this entry beforehand.

FIG. 9 is a diagram showing a configurational example of a database which is included in the terminal discrimination unit 303 within the reverse-charging service control apparatus 107. The database contains terminal types 902 indicating the sorts of terminals, in correspondence with telephone numbers 901. Each telephone number 901 can be formed of several upper digits (for example, a part corresponding to an office number) necessary for discriminating the terminal type, in the telephone number of a calling source or a called destination.

In the database shown in FIG. 9, an entry 903-1, for example, indicates that a PSTN subscriber telephone is registered in the terminal type 902 in a case where the information of the telephone number is not stored in the calling-source-telephone-number storage unit 307. The telephone numbers 901 registered at entries 903-2 and 903-3 are toll numbers in PSTN subscriber telephones, and the terminal types 902 of these entries indicate PSTN subscriber telephones. The telephone number 901 registered at an entry 903-N is the telephone number of an IP telephone, and the terminal type 902 of this entry indicates the IP telephone.

FIG. 10 is a diagram showing a configurational example of the database of the fee-rate discrimination unit 312 within the reverse-charging service control apparatus 107. The database contains reverse-charging service contractor terminals 1001 in which the sorts of the terminals of reverse-charging contractors are registered, and it contains PSTN fee rates 1003 in which the fee rates of the PSTN side are registered, as well as IP fee rates 1004 in which the fee rates of the IP network side are registered, in correspondence with call originating terminals 1002 in which the sorts of calling terminals, are registered.

In the database shown in FIG. 10, an entry 1005-1, for example, is an entry which indicates the PSTN fee rate 1003 and the IP fee rate 1004 in the case where the terminal (called destination) of a reverse-charging service contractor is an IP telephone, and where a call originating terminal that has originated a call to a reverse-charging service number is an IP telephone. Incidentally, the PSTN fee rate may well be omitted in the combination of these terminals. Likewise, an entry 1005-2 is an entry which indicates the PSTN fee rate 1003 and the IP fee rate 1004 in the case where the terminal of a reverse-charging service contractor is an IP telephone, and where a call originating terminal that has originated a call to a reverse-charging service number is a PSTN subscriber telephone. An entry 1005-3 is an entry which indicates the PSTN fee rate 1003 and the IP fee rate 1004 in the case where the terminal of a reverse-charging service contractor is a PSTN subscriber telephone, and where a call originating terminal that has originated a call to a reverse-charging service number is an IP telephone. An entry 1005-N is an entry which indicates the PSTN fee rate 1003 and the IP fee rate 1004 in the case where the terminal of a reverse-charging service contractor is a PSTN subscriber telephone, and where a call originating terminal that has originated a call to a reverse-charging service number is a PSTN subscriber telephone. Incidentally, the IP fee rate may well be omitted in the combination of these terminals.

Incidentally, although the fees based on 3 minutes are listed in FIG. 10, appropriate fee rates can be registered without being restricted to the list. Besides, in a case where pluralities of PSTN business companies and IP business companies are existent, fee rates corresponding to the combinations of the individual business companies can be registered. Next, there will be described the operation of the reverse charging service which is based on call origination from an IP telephone and call reception at the PSTN. More specifically, the operation corresponds to a case where an IP telephone subscriber receives the reverse charging service by originating a call from the IP telephone to a PSTN subscriber telephone which is a reverse-charging service contractor.

Figure 11:
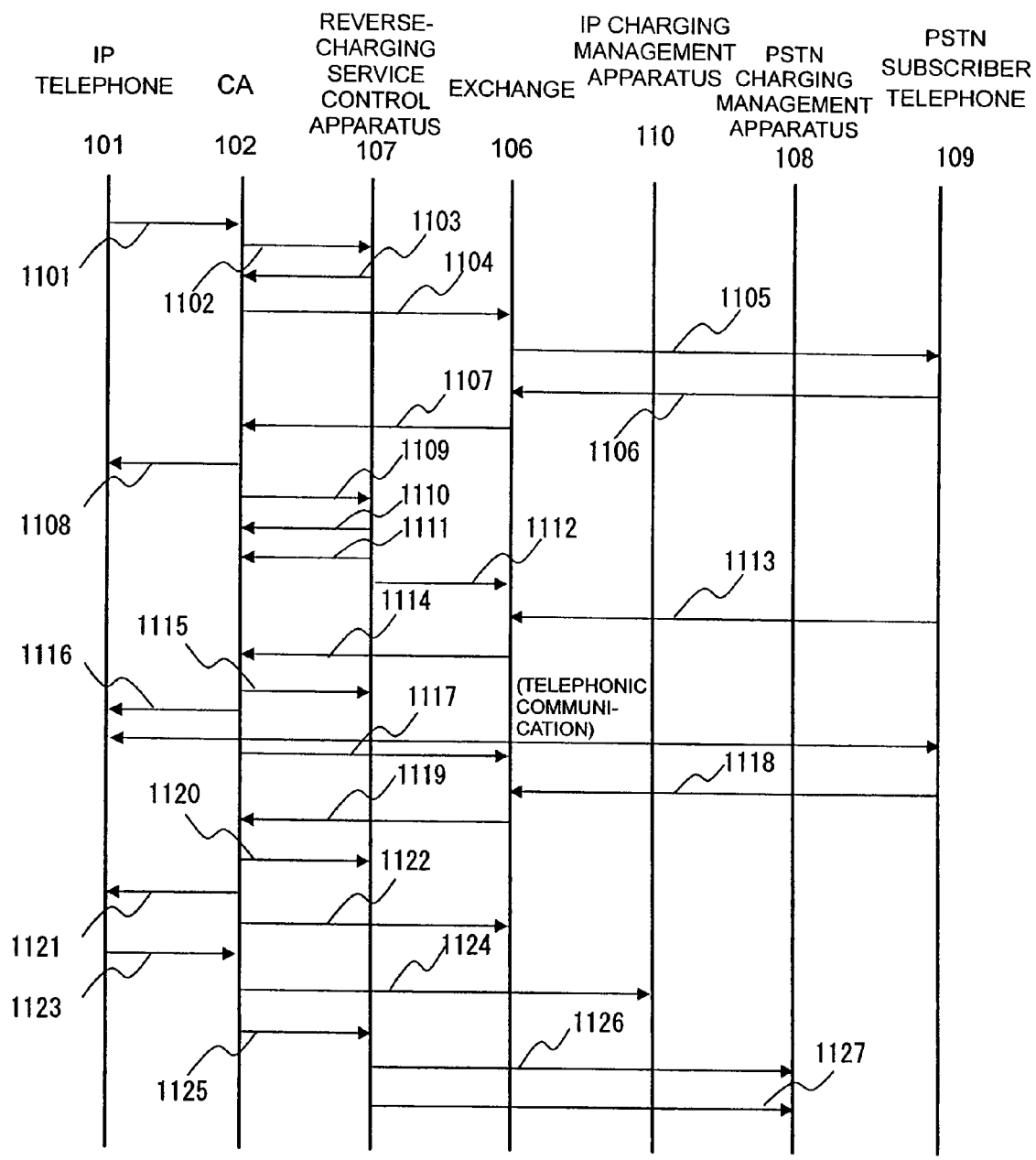
FIG. 11 is a diagram showing a sequence (call origination from an IP telephone) in the reverse charging service.
Figure 12:
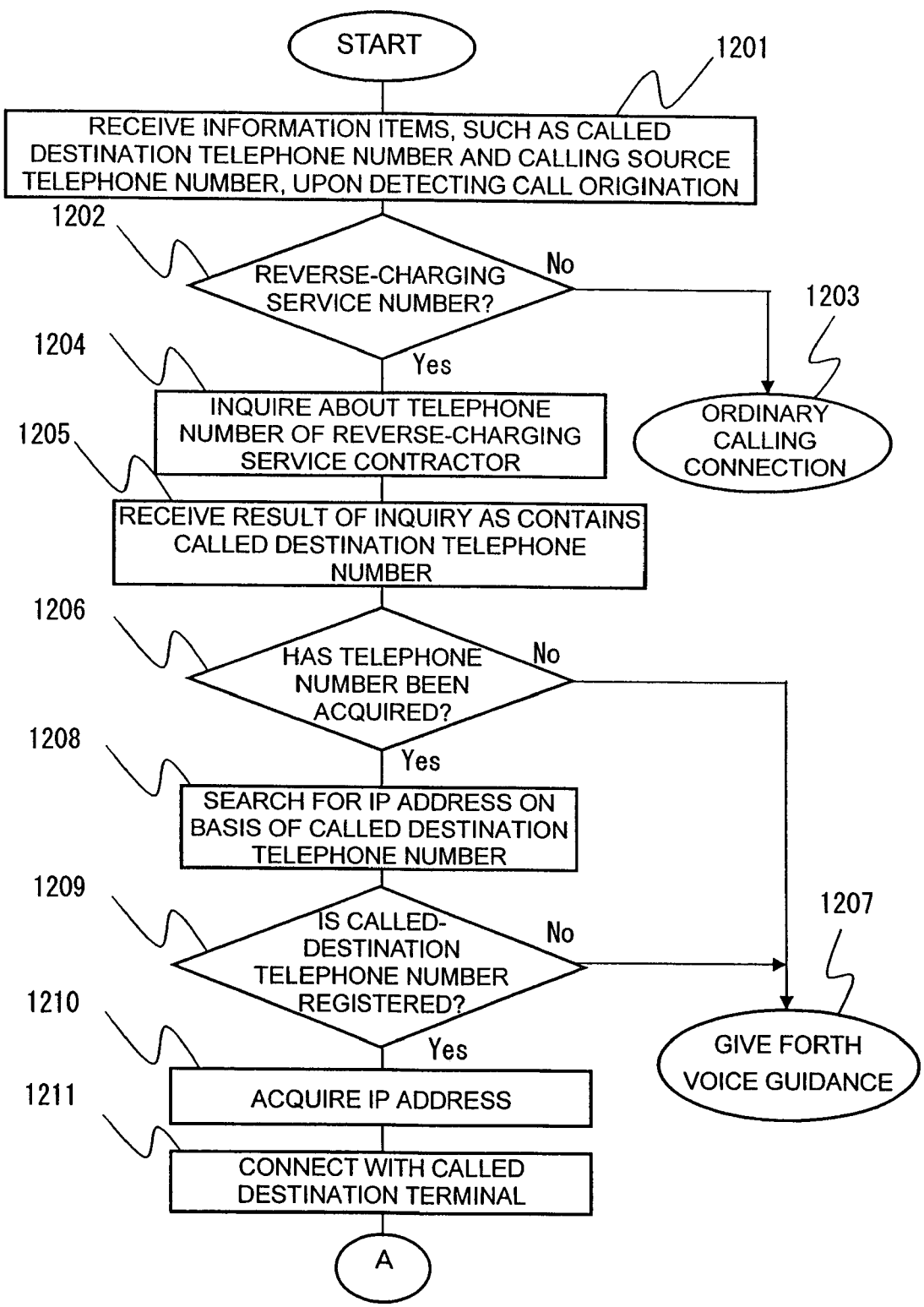
FIG. 12 is a diagram showing a flow chart (1) (call origination from the IP telephone) illustrative of the operation of a CA in the reverse charging service.
Figure 13:
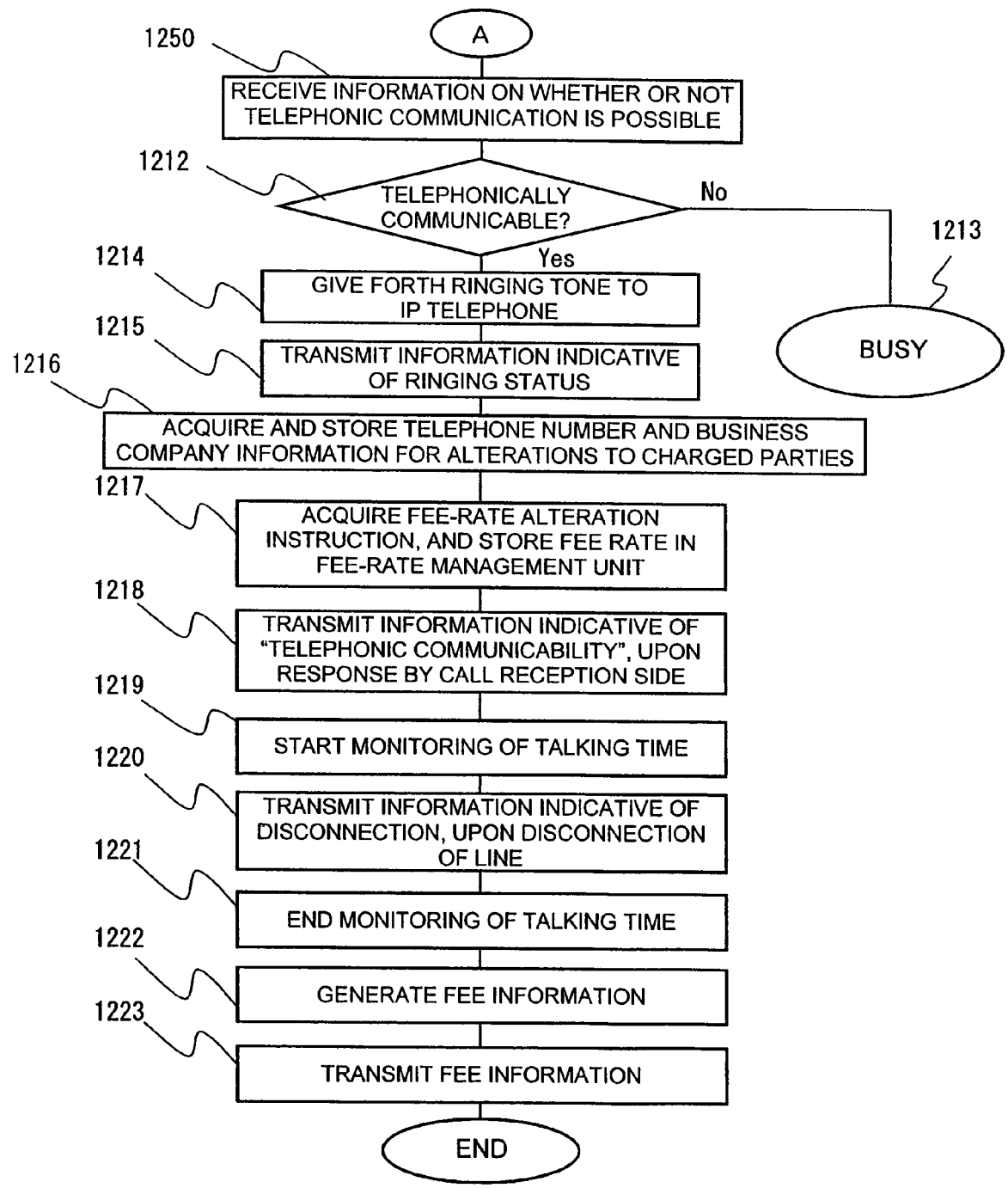
FIG. 13 is a diagram showing a flow chart (2) (call origination from the IP telephone) illustrative of the operation of the CA in the reverse charging service.
Figure 14:
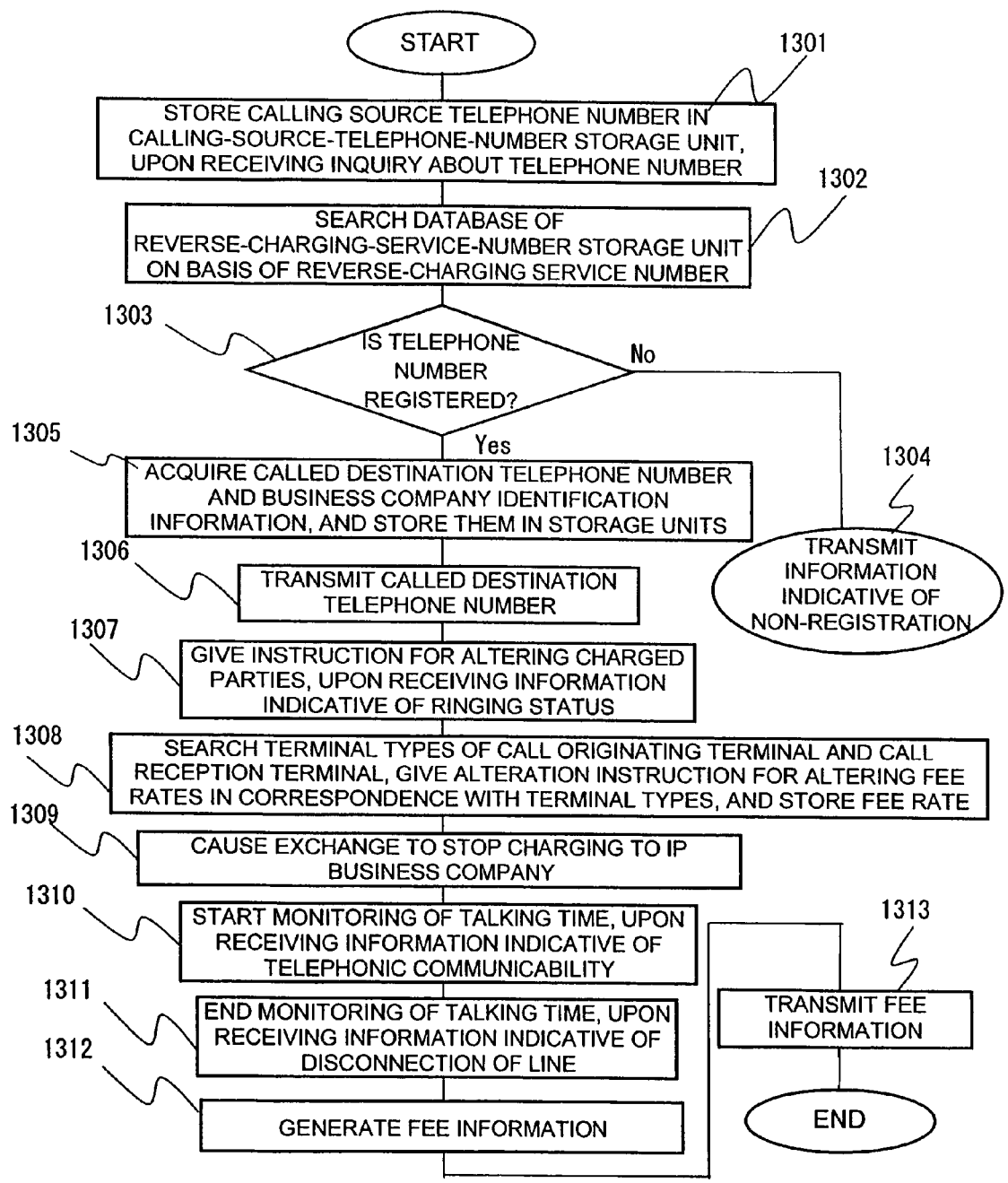
FIG. 14 is a flow chart (call origination from the IP telephone) showing the operation of the reverse-charging service control apparatus in the reverse charging service.

FIG. 11 shows an example of the sequence of the reverse charging service which is based on the call origination from the IP telephone and the call reception at the PSTN subscriber telephone. FIGS. 12 and 13 exemplify flow charts showing the operation of the CA 102 in the reverse charging service which is based on the call origination from the IP telephone and the call reception at the PSTN subscriber telephone. FIG. 14 exemplifies a flow chart showing the operation of the reverse-charging service control apparatus 107 in the reverse charging service which is based on the call origination from the IP telephone and the call reception at the PSTN subscriber telephone. Now, the operation of the reverse charging service will be described with reference to FIGS. 11-14.

First, the IP telephone 101 originates the call with a reverse-charging service number (for example, a number for reverse charging as begins with "0120") toward the PSTN subscriber telephone 109 which is the reverse-charging service contractor (FIG. 11: 1101). The CA 102 detects the call origination of the IP telephone 101, and receives information items necessary for calling connection, such as a called destination telephone number (here, the reverse-charging service number) and a calling source telephone number (FIG. 12: 1201). By way of example, the SIP process unit 203 in the CA 102 detects the call origination and receives the information through the IP-network interface 201. The CA 102 judges whether or not the called destination telephone number acquired is the routing number of the reverse charging service, by the routing-number discrimination unit 211 which is included in the CA itself (1202). Incidentally, processes and steps in the CA 102 are controlled or dealt with by the CA control unit 202. In a case where the called destination telephone number acquired is not the routing number of the reverse charging service (1202), the CA 102 judges ordinary calling connection and processes it (1203). On the other hand, in a case where the acquired number is the routing number of the reverse charging service (1202), the CA 102 transmits the reverse-charging service number 601 and the calling source telephone number to the reverse-charging service control apparatus 107 through the common channel signaling network 105 and inquires about the called destination telephone number 602 of the reverse-charging service contractor (1102 and 1204).

The reverse-charging service control apparatus 107 (for example, the reverse-charging control unit 302, and the same will apply in the ensuing description unless otherwise specified) receives the reverse-charging service number 601 and the calling source telephone number from the CA 102, and it stores the received calling source telephone number in the calling-source-telephone-number storage unit 307 (FIG. 14: 1301). Further, the reverse-charging service control apparatus 107 examines the reverse-charging service numbers 601 registered in the database of the reverse-charging-service-number storage unit 311 included in the apparatus itself, on the basis of the received reverse-charging service number 601 (1302). In a case where the corresponding number is not registered in the database (1303), the reverse-charging service control apparatus 107 transmits information indicative of the non-registration to the CA 102 (1304). On the other hand, in a case where the corresponding number is registered (1303), the reverse-charging service control apparatus 107 acquires the called destination telephone number 602 and the business company identification information 604 which correspond to the reverse-charging service number 601 registered in the database, and it stores the called destination telephone number 602 in the called-destination-telephone-number storage unit 306 included in the apparatus itself and also stores the business company identification information 604 in the charged-party-business-company storage unit 313 (1305). The reverse-charging service control apparatus 107 transmits an inquiry result containing the acquired called-destination telephone number 602, to the CA 102 through the common channel signaling network 105 (1103 and 1306).

The CA 102 (for example, the CA control unit 202, and the same will apply in the ensuing description unless otherwise specified) receives the result of the inquiry as contains the called destination telephone number 602 (1205). In a case where the CA 102 has received the information indicative of the non-registration, or where it has failed to acquire the called destination telephone number 602 within a predetermined time since the inquiry about the called destination telephone number (1206), the data of voice guidance is read-out of the voice-guidance sending unit 204 included in the CA 102, the data is converted into voice packets by the voice-signal conversion unit 205, and the voice guidance is given forth to the IP telephone 101 being the calling source (1207). On the other hand, in a case where the CA 102 has succeeded in acquiring the called destination telephone number 602 (1206), this CA 102 examines the called destination telephone numbers 801 registered in the database of the IP-address storage unit 206 included in the CA 102 itself, on the basis of the received called-destination telephone number 602 (1208). In a case where the corresponding called-destination telephone number 801 is not registered (1209), the CA 102 gives forth the voice guidance to the IP telephone 101 similarly to the above (1207). On the other hand, in a case where the corresponding called-destination telephone number 801 is registered (1209), the CA 102 acquires the IP address 802 corresponding to the called destination telephone number 801 (1210).

The CA 102 is connected with the exchange 106 accommodating the PSTN subscriber telephone 109 of the reverse-charging service contractor, through the IP network 103 and the MG 104 indicated by the IP address, on the basis of the acquired IP address 802 and called destination telephone number 801 (1104 and 1211). The exchange 106 is connected with the PSTN subscriber telephone 109 of the reverse-charging service contractor on the basis of the called destination telephone number 801, and it inquires IP telephonic communication is possible (1105). The PSTN subscriber telephone 109 judges whether or not call reception is possible, and it sends propriety information to the exchange 106 in reply (1106). The exchange 106 having received the information transmits the information to the CA 102 (1107). The CA 102 receives the propriety information on the telephonic communication (1250). In a case where the received information is not information indicative of telephonic communicability (1212), the CA 102 transmits busy tone to the IP telephone 101 (1108 and 1213). On the other hand, in a case where the received information indicates the telephonic communicability, the CA 102 gives forth ringing tone to the IP telephone 101 (1108 and 1214). Besides, the CA 102 transmits information indicative of a ringing status to the reverse-charging service control apparatus 107 (1109 and 1215). Incidentally, processes (for example, 1104 and 1108) concerning the connection with the PSTN subscriber telephone can be executed in accordance with a predetermined protocol by, for example, the SIP process unit 203.

Upon receiving the information indicative of the ringing status from the CA 102, the reverse-charging service control apparatus 107 transmits to the CA 102 an alteration instruction which contains the telephone number stored in the called-destination-telephone-number storage unit 306 and the business company of the identification information 604 stored in the charged-party-business-company storage unit 313, and which instructs the CA 102 to alter them to charged parties (1110 and 1307). Upon receiving the alteration instruction, the CA 102 stores the telephone number and the business company identification information which are contained in the alteration instruction and which are to be altered to the charged party, in the charged-party management unit 213 (1216).

In order to give a fee-rate alteration instruction, the reverse-charging service control apparatus 107 reads out the telephone number stored in the calling-source-telephone-number storage unit 307, and it examines the read-out telephone number and discriminates the terminal type 902 of the call originating terminal on the basis of the telephone number 901 by the terminal discrimination unit 303 included in the apparatus itself. Besides, the reverse-charging service control apparatus 107 similarly discriminates the terminal type of the reverse-charging service contractor terminal (call reception terminal) as to the telephone number 602 stored in the called-destination-telephone-number storage unit 306. On the basis of the discriminated terminal types, the reverse-charging service control apparatus 107 discriminates that entry of the database of the fee-rate discrimination unit 312 in which the pertinent service contractor terminal and call originating terminal agree with the information items of the reverse-charging service contractor terminal 1001 and call originating terminal 1002, respectively, so as to acquire the corresponding PSTN fee rate and IP fee rate. Besides, the reverse-charging service control apparatus 107 transmits the alteration instruction containing the acquired IP fee rate 1004, to the CA 102 (1111 and 1308). The CA 102 receives the alteration instruction containing the IP fee rate, and stores the IP fee rate in the database of the fee-rate management unit 209 (1217). Besides, the reverse-charging service control apparatus 107 stores the acquired PSTN fee rate 1003 in the fee-rate management unit 309 (1308).

The reverse-charging service control apparatus 107 (for example, the charging stop unit 314) causes the exchange 106 (exchange connected at the step 1104), which accommodates the PSTN subscriber telephone 109 being the reverse-charging service contractor, to stop charging to the IP business company (1112 and 1309). Usually, in the connection from the IP business company (IP telephone) to the exchange 106, this exchange 106 charges a fee for the connection thereto and demands payment from the IP business company. In this embodiment, however, the charging of the exchange to the IP business company needs to be stopped for performing the reverse charging, that is, for charging to the PSTN side. This embodiment consists, for example, in that the charging by the exchange on the call reception side is stopped so as to charge the fee by the reverse-charging service control apparatus 107, and that the charged party is altered to the called destination telephone number in the charging of the call originating side.

When the handset of the PSTN subscriber telephone 109 has been taken up, this PSTN subscriber telephone 109 being the reverse-charging service contractor transmits information indicative of the establishment of a telephonically communicable status to the exchange 106 (1113). The exchange 106 receives the information, and transmits information indicative of telephonic communicability to the CA 102 (1114). The CA 102 receives the information, and transmits this information to the reverse-charging service control apparatus 107 (1115 and 1218). Besides, the CA 102 having received the information starts the monitoring of a talking time by the time monitoring unit 208 (1219). Besides, the reverse-charging service control apparatus 107 having received the information starts the monitoring of the talking time by the time monitoring unit 308 (1310).

The CA 102 (for example, the SIP process unit 203) transmits the information indicative of the telephonic communicability to the IP telephone 101 (1116). Thus, the telephonic communication between the IP telephone 101 and the PSTN subscriber telephone 109 is permitted. Further, the CA 102 acknowledges the reception of the information to the exchange 106 (1117), and it continues the monitoring of the talking time until either of the IP telephone 101 and the PSTN subscriber telephone 109 being the reverse-charging service contractor disconnects a line.

Here, a case where the PSTN subscriber telephone 109 has disconnected the line will be described by way of example. When the handset of the PSTN subscriber telephone 109 has been put back to disconnect the line, information indicative of the disconnection is transmitted from the PSTN subscriber telephone 109 to the exchange 106 (1118). The exchange 106 receives the information and transmits information indicative of the disconnection to the CA 102 (1119), whereupon the CA 102 receives the information and transmits this information to the reverse-charging service control apparatus 107 (1120 and 1220). Besides, the CA 102 having received the information ends the monitoring of the talking time by the time monitoring unit 208 (1221). Likewise, the reverse-charging service control apparatus 107 having received the information ends the monitoring of the talking time by the time monitoring unit 308 (1311). Further, the CA 102 transmits information indicative of the disconnection of the line to the IP telephone 101 (1121), and it acknowledges the disconnection to the exchange 106 (1122). When the handset of the IP telephone 101 has been put back, information indicative of the disconnection is transmitted from the IP telephone 101 to the CA 102 (1123).

After the telephonic communication has ended, the fee calculation unit 210 of the CA 102 calculates a fee (charging information) on the basis of the talking time monitored by the time monitoring unit 208, and the IP fee rate stored in the fee-rate management unit 209. Further, it sets the telephone business company (here, the PSTN business company A) stored in the charged-party management unit 213, as a charged party, and it generates first fee information which contains the charged party and the charging information (1222). Besides, the fee calculation unit 210 sets the called destination telephone number of the reverse-charging service contractor as stored in the charged-party management unit 213, as a charged party, and it generates second fee information which contains the charged party and the calculated fee information (1222). In this manner, the fee calculation unit 210 generates the two kinds of fee information which have the different charged parties. Incidentally, the fees calculated here are the fees of the IP network side, and they do not contain any fee of the PSTN side (for example, a connection fee involved between the business sites of the exchange and the MG).

The CA 102 transmits to the IP charging management apparatus 110 (call originating side) the first fee information in which the telephone business company of the reverse-charging service contractor is set as the charged party (1124 and 1223). The IP charging management apparatus 110 receives the first fee information, it examines the charged party information 501 of the database included in the apparatus itself, on the basis of the information set as the charged party, and it adds the charging information contained in the first fee information, to the charging information 502 corresponding to the pertinent charged party information 501. By way of example, in the exemplary database shown in FIG. 5, the charging information contained in the first fee information is added to the charging information of the entry 503-N. Incidentally, a total fee up to the last telephone call is charged in the charging information 502, and a bill is managed by adding the charging information 502 received anew.

Further, the CA 102 transmits the second fee information in which the called destination telephone number of the reverse-charging service contractor is set as the charged party (1126), to the PSTN charging management apparatus 108 (call reception side) via, for example, the reverse-charging service control apparatus 107 (1125 and 1223). The PSTN charging management apparatus 108 receives the second fee information, it examines the charged party information 401 of the database included in the apparatus itself, on the basis of the information set as the charged party, and it adds the charging information contained in the second fee information, to the charging information 402 corresponding to the pertinent charged party information 401, thereby to manage a bill. By way of example, in the exemplary database shown in FIG. 4, the charging information contained in the second fee information is added to the charging information of the entry 403-1.

The fee calculation unit 310 of the reverse-charging service control apparatus 107 calculates a fee (charging information) on the basis of the talking time monitored by the time monitoring unit 308, and the PSTN fee rate stored in the fee-rate management unit 309. It generates third fee information in which the called destination telephone number of the reverse-charging service contractor as stored in the called-destination-telephone-number storage unit 206 is set as a charged party (1312). The reverse-charging service control apparatus 107 transmits the generated third fee information to the PSTN charging management apparatus 108 (call reception side) (1127 and 1313). The PSTN charging management apparatus 108 receives the third fee information, it examines the charged party information 401 of the database included in the apparatus itself, on the basis of the information set as the charged party, and it adds the charging information contained in the third fee information, to the charging information 402 corresponding to the pertinent charged party information 401, thereby to manage a bill. By way of example, in the exemplary database shown in FIG. 4, the charging information contained in the third fee information is added to the charging information of the entry 403-1. Accordingly, the fee of the IP side and that of the PSTN side are added up and charged to the PSTN subscriber telephone being the called destination, as thus far described.

Owing to the above operation, the reverse charging service can be provided in the case where the IP telephone subscriber has originated the call to the PSTN subscriber telephone being the reverse-charging service contractor. Incidentally, the PSTN business company demands the payment of the sum between the fee of the IP network and that of the PSTN network, from the PSTN subscriber telephone 109 in accordance with the fee information stored in the PSTN charging management apparatus 108, while the IP business company demands the payment of the fee of the IP network from the PSTN business company in accordance with the fee information stored in the IP charging management apparatus 110.

Figure 15:
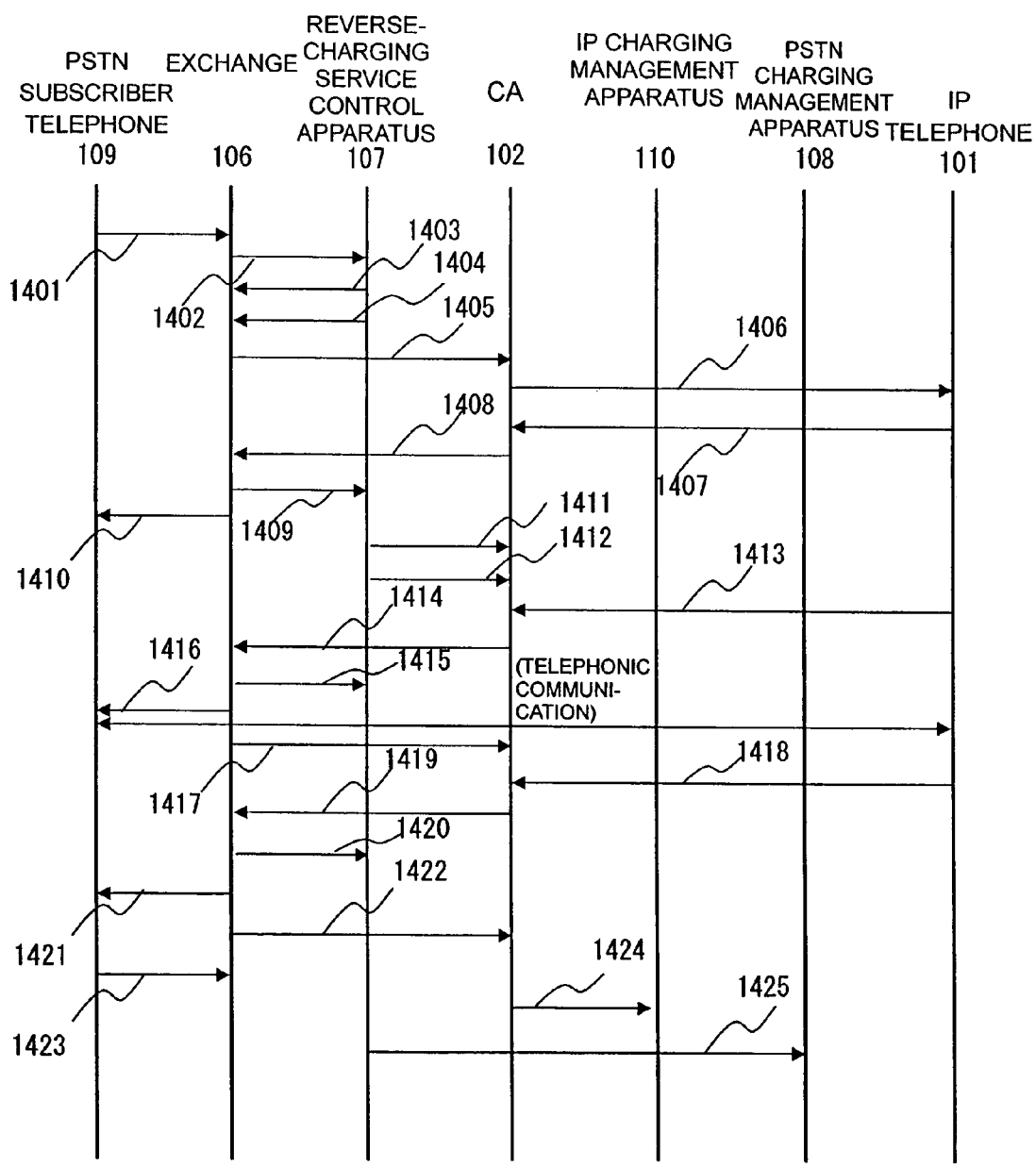
FIG. 15 is a diagram showing a sequence (call origination from a PSTN subscriber telephone) in the reverse charging service.
Figure 16:
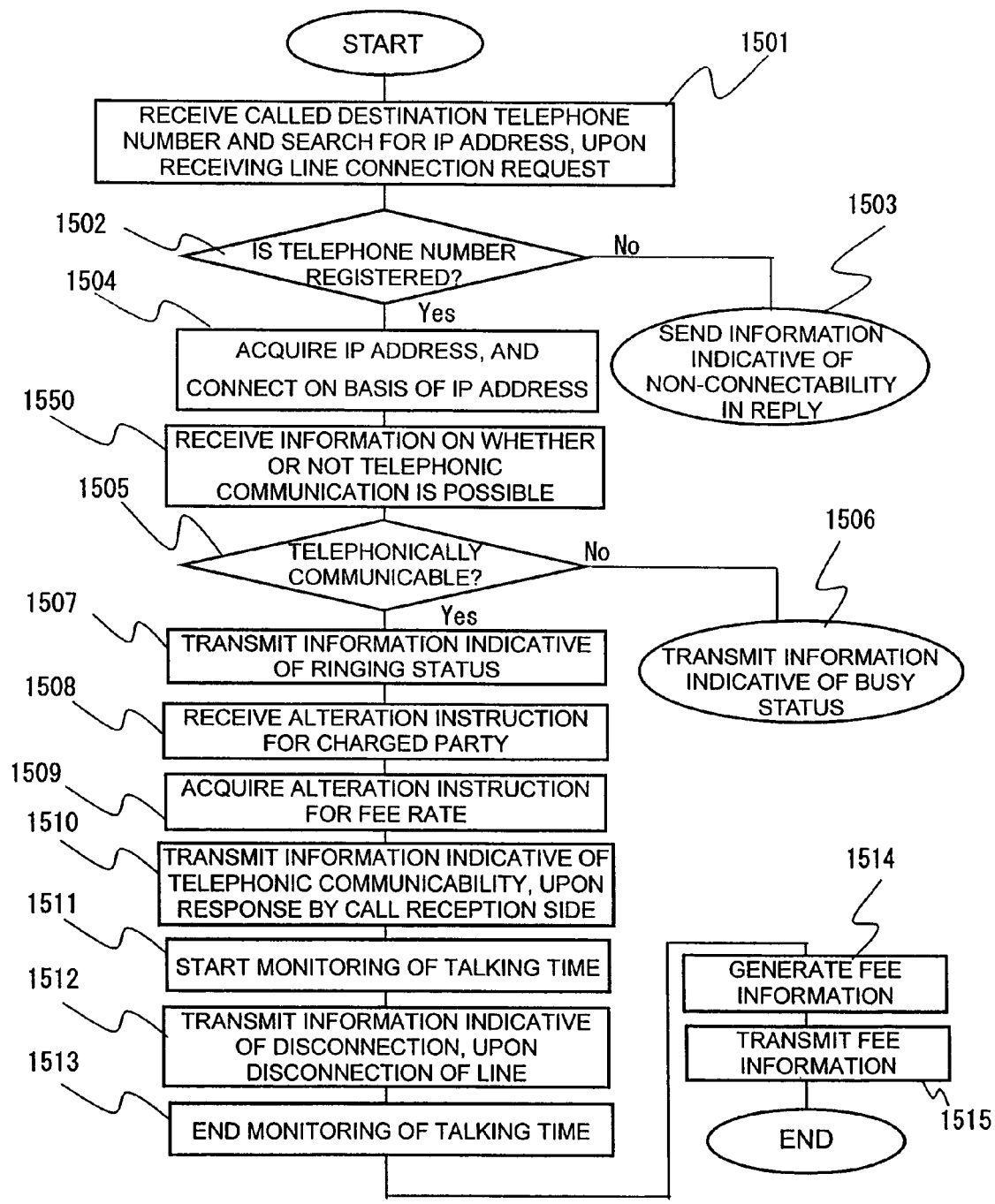
FIG. 16 is a diagram showing a flow chart (call origination from the PSTN subscriber telephone) illustrative of the operation of the CA in the reverse charging service.
Figure 17:
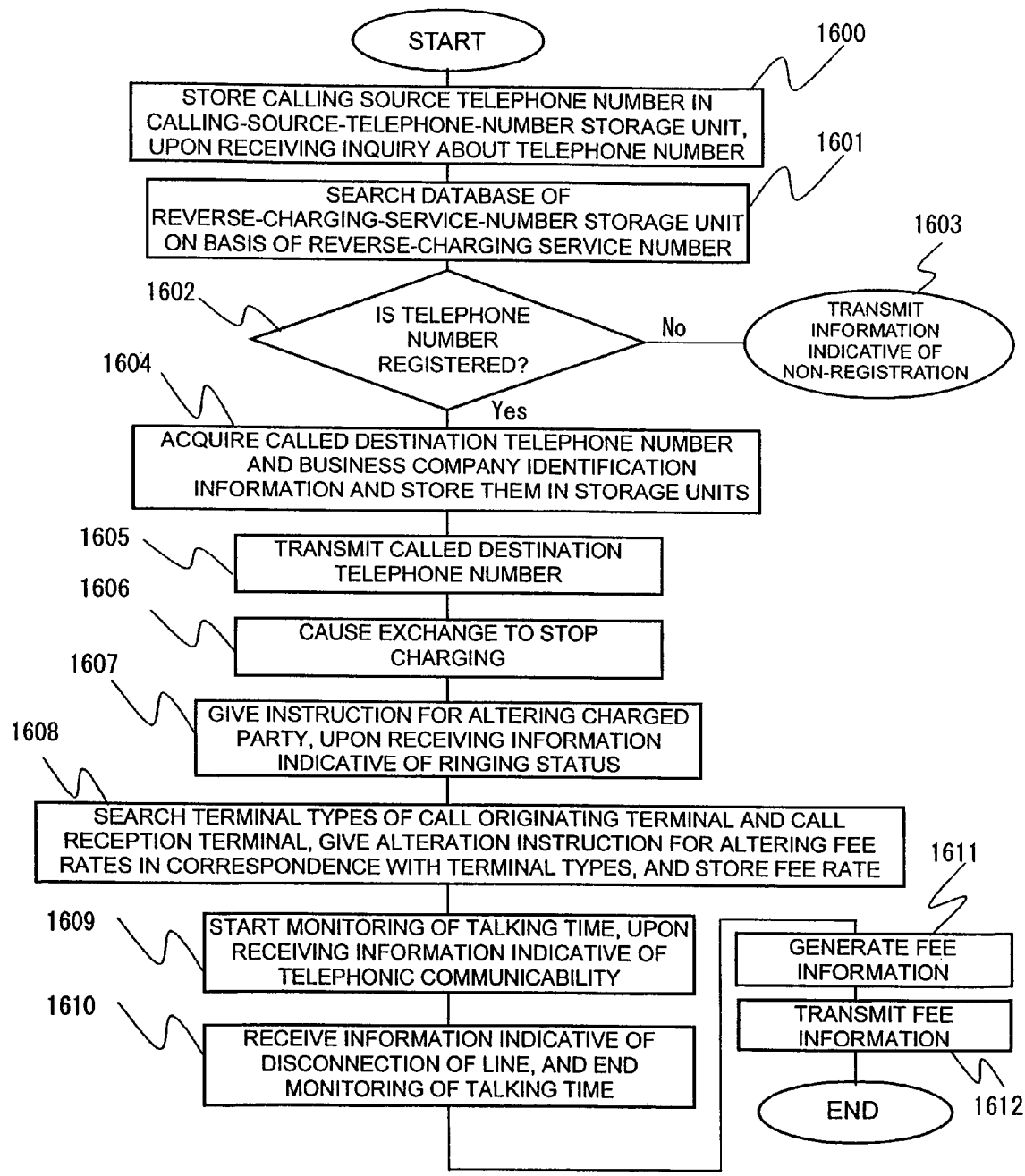
FIG. 17 is a diagram showing a flow chart (call origination from the PSTN subscriber telephone) illustrative of the operation of the reverse-charging service control apparatus in the reverse charging service.

Next, there will be described the operation of the reverse charging service which is based on call origination from a PSTN telephone and call reception at an IP telephone. More specifically, the operation corresponds to a case where a PSTN subscriber receives the reverse charging service by originating a call to the IP telephone which is a reverse-charging service contractor. FIG. 15 shows an example of the sequence of the reverse charging service which is based on the call origination from the PSTN subscriber telephone. FIG. 16 exemplifies a flow chart showing the operation of the CA 102 in the reverse charging service which is based on the call origination from the PSTN subscriber telephone. FIG. 17 exemplifies a flow chart showing the operation of the reverse-charging service control apparatus 107 in the reverse charging service which is based on the call origination from the PSTN subscriber telephone. Now, the operation of the reverse charging service will be described with reference to FIGS. 15-17.

First, the PSTN subscriber telephone 109 originates the call with a reverse-charging service number toward the IP telephone 101 which is the reverse-charging service contractor (FIG. 15: 1401). The exchange 106 detects the call origination of the PSTN subscriber telephone 109, and receives information items necessary for calling connection, such as a called destination telephone number (here, the reverse-charging service number) and a calling source telephone number. The exchange 106 decides whether the called destination telephone number received is the reverse-charging service number or the number of ordinary call origination. In case of the reverse-charging service number, the exchange 106 transmits the reverse-charging service number and the calling source telephone number to the reverse-charging service control apparatus 107 and inquires about the called destination telephone number of the reverse-charging service contractor (1402).

The reverse-charging service control apparatus 107 receives the reverse-charging service number and the calling source telephone number from the exchange 106, and stores the received calling-source telephone number in the calling-source-telephone-number storage unit 307 (FIG. 17: 1600). Further, the reverse-charging service control apparatus 107 examines the reverse-charging service numbers 601 registered in the database of the reverse-charging-service-number storage unit 311 included in the apparatus itself, on the basis of the received reverse-charging service number 601 (1601). In a case where the corresponding number is not registered (1602), the reverse-charging service control apparatus 107 transmits information indicative of the non-registration to the exchange 106 (1603). On the other hand, in a case where the corresponding number is registered (1602), the reverse-charging service control apparatus 107 acquires the called destination telephone number 602 and the business company identification information 604 which correspond to the reverse-charging service number 601 registered in the database, and it stores the called destination telephone number 602 in the called-destination-telephone number storage unit 306 included in the apparatus itself and also stores the business company identification information 604 in the charged-party-business-company storage unit 313 (1604). The reverse-charging service control apparatus 107 transmits an inquiry result containing the acquired called-destination telephone number 602, to the exchange 106 through the common channel signaling network 105 (1403 and 1605). Besides, the reverse-charging service control apparatus 107 (for example, the charging stop unit 314) instructs the exchange 106 to bring the charging status of the PSTN subscriber telephone 109 being the call originator, into the non-charging status thereof (1404 and 1606).

The exchange 106 receives the result of the inquiry as contains the called destination telephone number 602. By way of example, in a case where the exchange 106 has acquired the information indicative of the non-registration, or where it has failed to acquire the called destination telephone number 602 within a predetermined time since the inquiry about the called destination telephone number, it gives forth the predetermined voice guidance to the PSTN subscriber telephone 109.

Subsequently, the exchange 106 transmits the received called-destination telephone number 602 to the CA 102 (1405). The CA 102 examines the called destination telephone numbers 801 registered in the database of the IP-address storage unit 206 included in the CA 102 itself, on the basis of the called destination telephone number 602 received (FIG. 16: 1501). In a case where the pertinent called destination telephone number 801 is not registered (1502), the CA 102 sends information indicative of non-connectability to the exchange 106 in reply (1503). On the other hand, in a case where the pertinent called destination telephone number 801 is registered, the CA 102 acquires the IP address 802 corresponding to the called destination telephone number 801. Then, the CA 102 is connected with the IP telephone 101 being the reverse-charging service contractor, through the IP network 103 on the basis of the acquired IP address 802 (1504), and it inquires as to IP the IP telephone 101 is telephonically communicable (1406). The IP telephone 101 judges whether or not the call reception is possible. By way of example, in a case where the IP telephone 101 is busy, it sends information indicative of a busy status to the CA 102 in reply. On the other hand, in a case where the telephonic communication is possible, the IP telephone 101 sends information indicative of a ringing status in reply (1407).

The CA 102 receives an inquiry result which indicates whether or not the telephonic communication is possible (1550). In a case where the received inquiry information is the information indicative of the busy status, the CA 102 transmits information indicative of the busy status to the exchange 106 through the common channel signaling network 105 (1506). On the other hand, in a case where the CA 102 has received the information indicative of the ringing status, it transmits information indicative of the ringing status to the exchange 106 through the common channel signaling network 105 (1408 and 1507). The exchange 106 having received the information transmits information indicative of the ringing status to the reverse-charging service control apparatus 107 and the PSTN subscriber telephone 109 (1409 and 1410).

Besides, upon receiving the information indicative of the ringing status, the reverse-charging service control apparatus 107 transmits to the CA 102 an alteration instruction which contains the called destination telephone number stored in the called-destination-telephone-number storage unit 306, and which instructs the CA 102 to alter the number to a charged party (1411 and 1607). Upon receiving the alteration instruction, the CA 102 stores the called destination telephone number which is contained in the alteration instruction and which is to be altered to the charged party, in the charged-party management unit 213 (1508).

In order to give a fee-rate alteration instruction, the reverse-charging service control apparatus 107 reads out the calling source telephone number stored in the calling-source-telephone-number storage unit 307, and it examines the read-out calling-source telephone number and discriminates the terminal type 902 of the call originating terminal on the basis of the telephone number 901 by the terminal discrimination unit 303 included in the apparatus itself. Besides, the reverse-charging service control apparatus 107 similarly discriminates the terminal type of the call reception terminal as to the called destination telephone number 801 stored in the called-destination-telephone-number storage unit 306. On the basis of the discriminated terminal types, the reverse-charging service control apparatus 107 searches for that entry of the database of the fee-rate discrimination unit 312 in which the pertinent call reception terminal and call originating terminal agree with the information items of the reverse-charging service contractor terminal 1001 and call originating terminal 1002, respectively, so as to acquire the corresponding PSTN fee rate and IP fee rate. The reverse-charging service control apparatus 107 transmits the alteration instruction containing the acquired PSTN fee rate 1003 and IP fee rate 1004, to the CA 102 (1412 and 1608). Besides, the reverse-charging service control apparatus 107 stores the acquired PSTN fee rate 1003 in the fee-rate management unit 309. The CA 102 receives the alteration instruction containing the fee rates, and registers the received PSTN fee rate 1003 and IP fee rate 1004 in the database of the fee-rate management unit 209 (1509).

When the handset of the IP telephone 101 has been taken up, this IP telephone 101 being the reverse-charging service contractor transmits information indicative of the establishment of a telephonically communicable status to the CA 102 (1413). The CA 102 receives the information indicative of the telephonic communicability, and transmits similar information to the exchange 106 (1414 and 1510). The exchange 106 receives the information, and transmits information indicative of the telephonic communicability to the reverse-charging service control apparatus 107 and the PSTN subscriber telephone 109 (1415 and 1416). Thus, the telephonic communication between the PSTN subscriber telephone 109 and the IP telephone 101 is permitted.

Upon receiving the information indicative of the telephonic communicability, the CA 102 starts the monitoring of a talking time by the time monitoring unit 208 (1511). Besides, the reverse-charging service control apparatus 107 receives the information indicative of the telephonic communicability from the exchange 106, and it starts the monitoring of the talking time by the time monitoring unit 308 (1609). Further, the exchange 106 acknowledges the reception of the information to the CA 102 (1417), and it continues the monitoring of the talking time until either of the PSTN subscriber telephone 109 and the IP telephone 101 being the reverse-charging service contractor disconnects a line.

Here, a case where the IP telephone 101 has disconnected the line will be described by way of example. When the handset of the IP telephone 101 has been put back to disconnect the line, information indicative of the disconnection is transmitted from the IP telephone 101 to the CA 102 (1418). The CA 102 receives the information and transmits information indicative of the disconnection of the line to the exchange 106 (1419 and 1512). The exchange 106 receives the information and transmits this information to the reverse-charging service control apparatus 107 (1420). Besides, the CA 102 having received the information ends the monitoring of the talking time by the time monitoring unit 208 (1513). Likewise, the reverse-charging service control apparatus 107 having received the information indicative of the disconnection of the line ends the monitoring of the talking time by the time monitoring unit 308 (1610). Further, the exchange 106 transmits information indicative of the disconnection of the line to the PSTN subscriber telephone 109 (1421). Besides, the exchange 106 acknowledges the disconnection to the CA 102 (1422). When the handset of the PSTN subscriber telephone 109 has been put back, information indicative of the disconnection is transmitted from the PSTN subscriber telephone 109 to the exchange 106 (1423).

After the telephonic communication has ended, the fee calculation unit 210 of the CA 102 calculates a fee (charging information) on the basis of the talking time monitored by the time monitoring unit 208, and the IP fee rate and PSTN fee rate stored in the fee-rate management unit 209. Further, it sets the called destination telephone number stored in the charged-party management unit 213, as a charged party, and it generates fourth fee information which contains the charged party and the charging information (1514). The CA 102 transmits the fourth fee information to the IP charging management apparatus 110 (1424 and 1515). The IP charging management apparatus 110 receives the fourth fee information, it examines the charged party information 501 of the database included in the apparatus itself, on the basis of the information set as the charged party, and it adds the charging information contained in the fourth fee information, to the charging information 502 corresponding to the pertinent charged party information 501, thereby to manage a bill.

Besides, the fee calculation unit 310 of the reverse-charging service control apparatus 107 calculates a fee (charging information) on the basis of the talking time monitored by the time monitoring unit 308, and the PSTN fee rate stored in the fee-rate management unit 309. It generates fifth fee information in which the business company of the identification information (here, the IP business company A) as stored in the charged-party-business-company storage unit 313 is set as a charged party, and which contains the charged party and the charging information (1611). The reverse-charging service control apparatus 107 transmits the fifth fee information to the PSTN charging management apparatus 108 (1425 and 1612). The PSTN charging management apparatus 108 receives the fifth fee information, it examines the charged party information 401 of the database included in the apparatus itself, on the basis of the information set as the charged party, and it adds the charging information contained in the fifth fee information, to the charging information 402 corresponding to the pertinent charged party information 401, thereby to manage a bill.

Owing to the above, the reverse charging service can be realized even in the case where the owner of the PSTN subscriber telephone has originated the call to the IP telephone being the reverse-charging service contractor. Incidentally, the PSTN business company demands the payment of the fee of the PSTN network from the IP business company in accordance with the fee information stored in the PSTN charging management apparatus 108, while the IP business company demands the payment of the sum between the fee of the IP network and that of the PSTN network, from the IP subscriber telephone 101 in accordance with the fee information stored in the IP charging management apparatus 110.

Next, a different embodiment for the creation of fee information will be described. Apart from the methods described above, the CA 102 and the reverse-charging service control apparatus 107 can appropriately-generate and transmit fee information. More specifically, the reverse-charging service control apparatus 107 and the call agent 102 are allowed to generate fee information on the basis of a talking time and fee rates so that the sum of fees in the IP network and the public switching telephone network may be charged to a called destination telephone number which is stored in the called-destination-telephone-number storage unit 306 and the charged-party management unit 213, and they are allowed to transmit the generated fee information to the charging management apparatus which the business company (for example, PSTN business company) on a call reception side manages. In addition, the reverse-charging service control apparatus 107 and the call agent 102 are allowed to generate fee information so that a fee in the network on the side of a call originating terminal (for example, IP telephone) maybe charged to the business company of the business company identification information of a called destination which is stored in the charged-party-business-company storage unit 313 and/or the charged-party management unit 213, and they are allowed to transmit the generated fee information to the charging management apparatus which the business company (for example, IP business company) of a calling source manages.

It is also allowed, for example, to stop the charging operations of the exchange 106 and the CA 102, and to generate all fee information items by the reverse-charging service control apparatus 107. Now, the case where the reverse-charging service control apparatus 107 generates all the fee information items will be described by taking as an example the case of call origination from an IP telephone and call reception at a PSTN subscriber telephone. In stopping the charging of the exchange 106, the reverse-charging service control apparatus 107 stops also the charging of the CA 102. The other processes which are executed since the call origination till the end of telephonic communication are the same as in the foregoing, and shall be omitted from description.

After the telephonic communication has ended, the fee calculation unit 310 of the reverse-charging service control apparatus 107 calculates a fee (charging information) on the basis of the talking time monitored by the time monitoring unit 308, and the IP fee rate stored in the fee-rate management unit 309. Further, it sets the business company of the business company identification information (here, PSTN business company A) stored in the charged-party management unit 313, as a charged party, and it generates fee information which contains the charged party and the charging information (corresponding to the step 1222). The reverse-charging service control apparatus 107 transmits the generated fee information to the IP charging management apparatus 110 (call origination side) (corresponding to the steps 1124 and 1223). The IP charging management apparatus 110 receives the fee information, and it adds the charging information to the corresponding entry as in the foregoing.

Further, the fee calculation unit 310 of the reverse-charging service control apparatus 107 calculates the sum of fees (charging information items) in the IP network and the PSTN on the basis of the talking time monitored by the time monitoring unit 308, as well as the IP fee rate stored in the fee-rate management unit 309, and the talking time as well as the PSTN fee rate, whereupon it generates fee information in which the called destination telephone number of the reverse-charging service contractor stored in the called-destination-telephone-number storage unit 206 is set as a charged party (corresponding to the step 1312). Incidentally, the IP fee rate and the PSTN fee rate which have been discriminated by the fee-rate discrimination unit 312 are stored in the fee-rate management unit 309 beforehand. By way of example, they are stored at the step 1308 stated before. The reverse-charging service control apparatus 107 transmits the generated fee information to the charging management apparatus (here, PSTN charging management apparatus 108) which corresponds to the business company identification information stored in the charged-party-business-company storage unit 313 (corresponding to the steps 1127 and 1313). The PSTN charging management apparatus 108 receives the fee information, and it adds the charging information 402 to the corresponding entry as in the foregoing.

In this manner, according to the present invention, it is possible to provide the reverse charging service directed from the IP telephone to the PSTN subscriber telephone. Accordingly, telephone calls through the IP networks which are generally inexpensive become possible, and the reverse-charging service contractors of the PSTN can provide reverse charging services without caring about the call fees of reception calls from very long distances. Moreover, according to the present invention, it is possible to provide reverse charging services which are directed from a PSTN subscriber telephone and an IP telephone to IP telephone subscribers, and which have hitherto been unavailable.

The invention claimed is:

1. A reverse charging method in a system which is applied to a telephone network in which an IP telephone set communicating through an IP network and a telephone set communicating through an exchange communicate through a media gateway between the IP network and the exchange, and the system has a call agent that performs a call control, and a control apparatus that performs a reverse charging service, wherein the reverse charging method comprising:

said call agent detects call origination from the IP telephone set to the telephone set, receives a reverse-charging service number for the reverse charging service, and transmits the reverse-charging service number to said control apparatus;

said control apparatus sends a called destination telephone number and/or business company identification information of a called destination as correspond to the received reverse-charging service number, to said call agent;

said call agent acquires an IP address of media gateway for communicating with the exchange that accommodates the telephone set of called destination telephone number, and connects the IP telephone set and the telephone set on the basis of the acquired IP address;

said control apparatus causes said exchange that accommodates the telephone set to stop charging;

said call agent and/or said control apparatus calculate a fee in the IP network and a fee in the telephone network on the basis of talking time; and said call agent and/or said control apparatus generate a fee information by setting charged party information so that a sum of fees in the IP network and the telephone network is charged to the called destination telephone number, and transmit the generated fee information to a PSTN charging management apparatus for the telephone network and also generate a fee information by setting charged party information so that a fee in the IP network is charged to a business company of the business company identification information of the called destination, and transmit the generated fee information to an IP charging management apparatus for the IP network.

2. A reverse charging method in a system which is applied to a telephone network in which an IP telephone set communicating through an IP network, and a telephone set communicating through an exchange communicate through a media gateway between the IP network and the exchange, and the system has a call agent that performs a call control, and a control apparatus that performs a reverse charging service, wherein the reverse charging method comprising:

said exchange detects call origination from the telephone set to the IP telephone set, receives a reverse-charging service number for the reverse charging service, and transmits the reverse-charging service number to said control apparatus;

said control apparatus sends a called destination telephone number and/or business company identification information of a called destination as correspond to the received reverse-charging service number, to said call agent or said exchange;

said call agent receives the called destination telephone number from said control apparatus or said exchange, acquires an IP address of IP telephone set of called destination telephone number, and connects the IP telephone set and the telephone set on the basis of the acquired IP address;

said control apparatus causes said exchange that accommodates the telephone set to stop charging;

said call agent and/or said control apparatus calculate a fee in the IP network and a fee in the telephone network on the basis of talking time; and said call agent and/or said control apparatus generate a fee information by setting charged party information so that a sum of fees in the IP network and the telephone network is charged to the called destination telephone number, and transmit the generated fee information to an IP charging management apparatus for the IP network, and also generate a fee information by setting charged party information so that a fee in the telephone network is charged to a business company of the business company identification information of the called destination, and transmit the generated fee information to a PSTN charging management apparatus for the telephone network.

* * * * *